(No Model.)

F. L. JONES.
NUT LOCK.

No. 448,432.  Patented Mar. 17, 1891.

Witnesses:

Inventor
Franklin L. Jones,
per O. H. Woodworth,
Attorney.

UNITED STATES PATENT OFFICE.

FRANKLIN L. JONES, OF COLUMBIA CITY, INDIANA, ASSIGNOR OF ONE-HALF TO JAMES B. PEABODY, OF SAME PLACE.

NUT-LOCK.

SPECIFICATION forming part of Letters Patent No. 448,432, dated March 17, 1891.

Application filed December 12, 1890. Serial No. 374,507. (No model.)

*To all whom it may concern:*

Be it known that I, FRANKLIN L. JONES, a citizen of the United States, residing in Columbia City, in the county of Whitley and State of Indiana, have invented certain new and useful Improvements in Nut-Locks, of which the following is a specification.

My invention consists of certain devices for readily and effectively locking ordinary screw-nuts on rods or bolts on which said nuts are screw-threaded; and the principal objects of my invention are, first, to provide a nut lock that shall be practical and effective in its application and use; second, to adapt and use as a nut-lock a compressible cap removably attached to the body of the nut and connected with the end of the bolt or rod on which said nut is screwed, and, third, to provide for attaching the locking-cap to the nut by simply compressing the cap laterally, and thereby securely locking the nut on the rod or bolt. I attain these objects by the mechanism illustrated in the accompanying drawings, in which—

Figure 1:
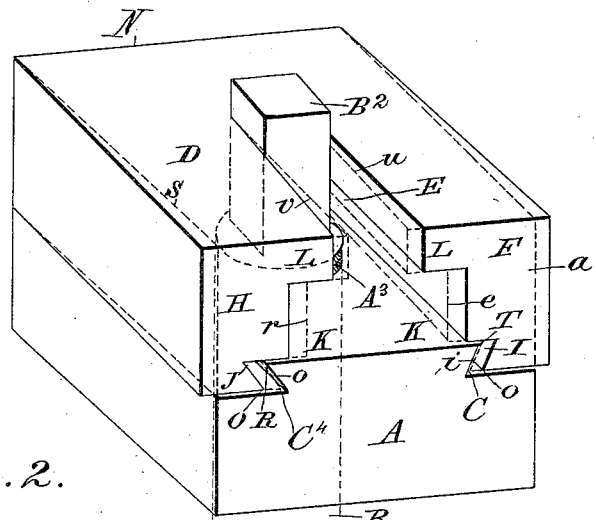
Figure 2:
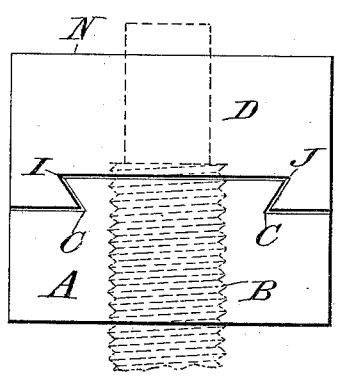
Figure 3:
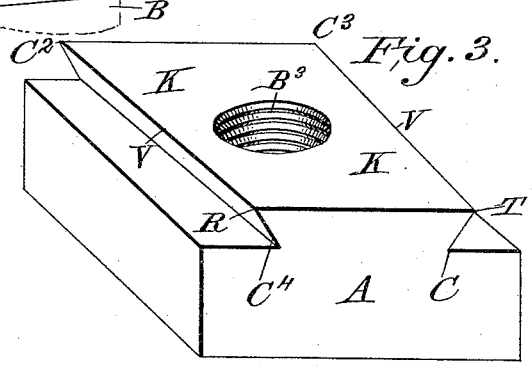
Figure 4:
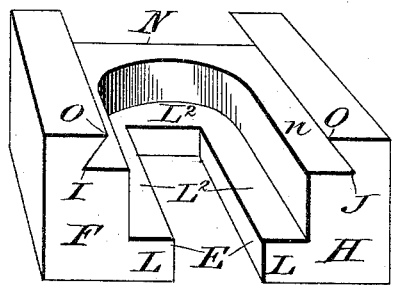

Figure 1 is a front and top perspective view of the invention, showing the locking-cap placed on the nut in position for locking, but not compressed. Fig. 2 is a rear view of the nut and its locking-cap. Fig. 3 is a front and top view of the nut without the cap and removed from the rod or bolt; and Fig. 4 shows the cap separated from the nut and inverted.

Similar letters of reference indicate corresponding parts throughout the several views, and the words in this specification indicating the front or rear or upper or lower portions of the invention refer arbitrarily to the positions shown in and by the drawings.

A represents the nut screwed on the rod or bolt B, which is squared or otherwise properly shaped at its upper end, as at $B^2$. D represents the locking-cap adapted to fit on and be compressed on the nut to lock the same, and F shows one wing and H the other wing of said cap.

$B^2$ shows the squared end of bolt B passing through slot E formed in the locking-cap between its two wings H and F.

K K is the raised top or plane of nut A, through the center of which is screw-threaded and extends bolt B, as shown. Plane K K is bounded exteriorly by the edges or lines $C^2$ to R, $C^3$ to T, R to T, and $C^2$ to $C^3$, with the lines $C^2$ to R and $C^3$ to T converging and making the plane somewhat wedge-shaped with its narrowest end toward the observer. The main lower side of nut A is practically square. The plane is cut in and under from T to C and from R to $C^4$, as shown.

In Fig. 4 a perspective view of the under side of the cap is shown, its lower inner flanges O being adapted to fit grooves C and $C^4$, as in Fig. 1, and its angular grooves I and J being adapted to receive the projecting upper angles or flanges R and T of plane or top K K.

Between the under surfaces of the two inner extensions L L of wings F and H and the upper surface of plane K K extends an open space, the object of which is to permit of a variation of the distance that the screw-cut upper portion $A^3$ of the rod or bolt may extend through the upper part of the nut or plane K K, thus forming an adjusting-space or take-up space for the nut and bolt as well as for the movements of the squared portion $B^2$ in and through slot E in cap D.

$L^2$ $L^2$ show the under sides of extensions L L, and N shows the thick rear portion of the cap fitting closely over plane K K on the two sides and the widest end thereof.

The width of the side of the cap, measured on line $w$, with the wings F and H open, as in Fig. 1, is greater than the width of its side measured on line $x$, and when wings F and H are completely closed the flanges or angles O of the cap fit into and completely fill the under-cuts or recesses C and $C^4$ in the sides of plane K K and the inner edges of extensions L L touch the sides of the squared end $B^2$ of bolt B, thus bringing the parts named from their present positions to the positions indicated by the broken lines $a, e, i, o, r, s, u$, and $v$. The wings of the cap being thus compressed and the extensions brought near to the squared end of bolt $B^2$ and the wedge-shaped and undercut sides of the plane holding the cap on the nut, the threaded bolt cannot be unscrewed from the nut nor the cap removed therefrom except by forcibly pressing or driving the cap backward, and thus forcibly expanding its wings until the squared end of the bolt passes out of and beyond the slot E in the cap, thus unlocking the nut and permitting it to be screwed up or down on the bolt, as desired.

In this invention I preferably make the locking-cap of malleable iron or other metal not of a brittle or elastic nature, and this I do in order that the wings may be closed by pressure or blows and will remain closed until the cap is driven or pressed off of the nut, as before stated.

Owing to its malleability, one cap may be locked on a nut, removed therefrom, and replaced thereon again several times without breaking the cap or rendering it useless.

This nut-lock may be applied to lock a nut on almost and rod or bolt used in any ordinary manner, and it is especially adapted for rods or bolts used in connecting the rails and other metallic portions of railroads, as well as for locking the nuts on nearly all sizes and lengths of metallic bolts or rods used in various kinds of machinery, bridges, and other structures in which a nut-lock is desirable.

The adjusting or take-up space adapts this invention to practical use in many places where ordinary nut-locks cannot be successfully applied or used.

The squared end of the bolt fitting in the slot in the cap when the latter is attached to the nut most effectually prevents the bolt from turning in the nut, thus forming a practically perfect nut-lock.

Having thus described my invention, what I claim as original, and desire to secure by Letters Patent of the United States, is—

1. A nut-lock consisting of a nut, a rod or bolt screw-threaded and extending through said nut and squared or otherwise angularly shaped at its protruding upper end and adapted to fit in a slot formed in a locking-cap attachable to said nut, substantially as and for the purposes set forth.

2. The combination of a locking-cap compressible on a nut and against the squared end of a bolt extending through the nut and adapted to fit in a slot in said locking-cap, and a nut adapted to receive and retain said cap, substantially as set forth.

3. The combination of a locking-cap of malleable metal, a squared bolt adapted to fit in a slot in said locking-cap, the bolt screw-threaded and extending through the nut, and the raised wedge-shaped plane on the upper side of the said nut, and the cap adapted to fit thereon, substantially as set forth.

4. The combination of the nut, the plane formed thereon, and the locking-cap adapted to be compressed on and attached to said nut, as set forth.

5. The combination of the nut, the wedge-shaped plane formed thereon, the locking-cap, the slot in said cap, the two extensions of the wings of said cap, the squared end of the bolt extending through said slot, and the adjusting-space between the plane of the nut and said extensions, substantially as set forth.

6. In a nut-lock, a compressible cap removably attached to the body of the nut and connected with the end of the bolt or rod on which said nut is screwed, in combination with the wings of the cap, the squared bolt, and the slot in the cap for securing the cap and nut together and thereby locking the nut, substantially as set forth.

FRANKLIN L. JONES.

Witnesses:
HENRY A. BRIGGEMANN,
ORSON H. WOODWORTH.